(12) United States Patent
Hoshi et al.

(10) Patent No.: US 9,744,884 B2
(45) Date of Patent: Aug. 29, 2017

(54) VEHICLE SEAT HAVING AN ELEVATION MECHANISM AND A CUSHION FRAME WITH RIGID PORTIONS

(71) Applicants: TS TECH CO., LTD., Asaka-shi, Saitama (JP); IMASEN ELECTRIC INDUSTRIAL CO., LTD., Inuyama-shi, Aichi (JP)

(72) Inventors: Masayuki Hoshi, Tochigi (JP); Takuto Esaki, Inuyama (JP); Takashi Yashiro, Inuyama (JP)

(73) Assignees: TS Tech Co., Ltd, Saitama (JP); Imasen Electric Industrial Co., Ltd., Aichi (JP)

(*) Notice: Subject to any disclaimer, the term of this patent is extended or adjusted under 35 U.S.C. 154(b) by 147 days.

(21) Appl. No.: 14/430,031

(22) PCT Filed: Sep. 21, 2012

(86) PCT No.: PCT/JP2012/074305
§ 371 (c)(1),
(2) Date: Mar. 20, 2015

(87) PCT Pub. No.: WO2014/045422
PCT Pub. Date: Mar. 27, 2014

(65) Prior Publication Data
US 2015/0210188 A1 Jul. 30, 2015

(51) Int. Cl.
*B60N 2/16* (2006.01)
*B60N 2/22* (2006.01)
(Continued)

(52) U.S. Cl.
CPC .............. *B60N 2/168* (2013.01); *B60N 2/165* (2013.01); *B60N 2/167* (2013.01); *B60N 2/1615* (2013.01);
(Continued)

(58) Field of Classification Search
CPC ...... B60N 2/168; B60N 2/1615; B60N 2/165; B60N 2/167; B60N 2/4228
See application file for complete search history.

(56) References Cited

U.S. PATENT DOCUMENTS

| 6,176,543 B1* | 1/2001 | Nawata | B60N 2/1615 296/187.11 |
| 6,276,650 B1* | 8/2001 | Kojima | B60N 2/071 248/421 |

(Continued)

FOREIGN PATENT DOCUMENTS

| JP | 2011-246024 A | 12/2011 |
| JP | 2012-076542 A | 4/2012 |

(Continued)

OTHER PUBLICATIONS

Office Action issued for related application JP 2014-536519, Dec. 1, 2015, with partial English translation, 5 pages.

*Primary Examiner* — David R Dunn
*Assistant Examiner* — Tania Abraham
(74) *Attorney, Agent, or Firm* — Drinker Biddle & Reath LLP

(57) ABSTRACT

Realized is a vehicle seat capable of improving the rigidity of a cushion frame with respect to a load input to a seat back while suppressing an increase in weight and size of the cushion frame. In a vehicle seat including a height adjustment mechanism which is driven to adjust the height of a seat cushion and a brake mechanism which maintains the height of the seat cushion when the height adjustment mechanism is not driven, the brake mechanism is connected to a second connection portion different from a first connection portion connected to the seat back in the cushion frame, and reinforcement portions and which extend in a direction from the first connection portion toward the second connection portion are provided between the first connection portion and the second connection portion in the cushion frame.

6 Claims, 9 Drawing Sheets

(51) Int. Cl.
*B60N 2/42* (2006.01)
*B60N 2/68* (2006.01)
*B60N 2/70* (2006.01)

(52) U.S. Cl.
CPC ............ *B60N 2/22* (2013.01); *B60N 2/4228* (2013.01); *B60N 2/4256* (2013.01); *B60N 2/68* (2013.01); *B60N 2/7094* (2013.01)

(56) References Cited

U.S. PATENT DOCUMENTS

| | | | | |
|---|---|---|---|---|
| 6,290,198 B1* | 9/2001 | Kojima | ................ | B60N 2/1615 248/396 |
| 6,773,069 B1* | 8/2004 | Kaneko | ................ | B60N 2/1615 297/344.15 |
| 6,902,234 B2* | 6/2005 | Becker | ................ | B60N 2/0715 248/421 |
| 7,766,427 B2* | 8/2010 | Kojima | ................... | B60N 2/06 248/423 |
| 2011/0025106 A1* | 2/2011 | Okamoto | ............ | B60N 2/1615 297/216.1 |
| 2013/0214576 A1 | 8/2013 | Hoshi et al. | | |

FOREIGN PATENT DOCUMENTS

| | | |
|---|---|---|
| WO | 2012/049871 A1 | 4/2012 |
| WO | WO 2012/049726 A1 | 4/2012 |

* cited by examiner

FRONT ←——→ BACK

FRONT ←——→ BACK

VEHICLE SEAT HAVING AN ELEVATION MECHANISM AND A CUSHION FRAME WITH RIGID PORTIONS

This application is a National Stage Entry application of PCT Application No. PCT/JP2012/074305, filed Sep. 21, 2012.

BACKGROUND

Disclosed herein is a vehicle seat, and particularly, a vehicle seat that includes an elevation mechanism adjusting the height of a seat cushion and a brake mechanism maintaining the height of a seat cushion when the elevation mechanism is not driven.

Among vehicle seats, a vehicle seat including a mechanism adjusting the position or the posture of a seat body is known, and an elevation mechanism adjusting the height of the seat body is exemplified as an example of the adjustment mechanism (for example, see Japanese Patent Document 2011-246024 A ("the '024 Document")). The elevation mechanism is generally disposed below a seat cushion, and is driven in a manner such that an occupant sitting on a vehicle seat manipulates a manipulation member such as a manipulation lever.

Further, the vehicle seat disclosed in "the '024 Document" includes a brake mechanism that maintains the height of the seat body when the elevation mechanism is not driven. Since the brake mechanism prevents a driving portion (for example, a pinion gear or the like) of the elevation mechanism from being driven unintentionally, the movement of the driving member is limited by a friction force or the like. In general, the brake mechanism is attached to the seat cushion, that is, a cushion frame constituting a framework of the seat cushion.

If a load generated by a rear collision or the like is applied to the vehicle seat in the front to back direction when the vehicle equipped with the vehicle seat travels, the load is first applied to a seat back of the vehicle seat. Subsequently, the load (hereinafter, also referred to as the input load) applied to the seat back is transmitted to the cushion frame of the seat cushion connected to a seat back frame. In a configuration in which a member like the above-described brake mechanism or the seat back frame is attached to the cushion frame, the rigidity of a portion other than the attachment portions of the other members in the cushion frame decreases inevitably. In the case of a seat structure in which a load transmitted from the seat back frame is continuously applied to such low-rigid portions, it is difficult to mention that this seat structure is desirable from the viewpoint of the strength of the cushion frame. For this reason, there is a need to improve the rigidity of the low-rigid portions of the cushion frame. Thus, a method is considered which further increases the size of the cushion frame in the width direction by further thickening the thicknesses of the low-rigid portions. However, in the above-described method, as a countermeasure, there is a possibility that the cushion frame may be increased in weight or size.

Further, when the seat back falls forward or backward by the load input to the seat back, a compression force and an extension force are simultaneously generated in the front to back direction near the connection portion with respect to the seat back frame in the cushion frame. For this reason, there is a need to improve the rigidity of the cushion frame with respect to these forces.

Further, when the cushion frame is equipped with a support shaft for supporting the other member or a rotary shaft for rotating the other member, the shaft needs to be supported stably. Particularly, when a plurality of shafts are attached to the cushion frame, the distance between the shafts needs to be maintained.

Further, when the rigidity of the portion without the other member like the brake mechanism in the cushion frame is improved, it is also desirable to improve the rigidity of the peripheral portion thereof. Similarly, it is desirable to improve the rigidity of the portion without the other member like the brake mechanism in the cushion frame and to improve the rigidity of the portion with the other member.

Further, there is a case in which the elevation mechanism includes a gear such as a sector gear as the component thereof. Here, when the gear is disposed near the cushion frame, there is a need to suppress an increase in size of the cushion frame while avoiding the interference with the gear.

SUMMARY

Therefore, various embodiments of the invention are made in view of the above-described problem, and an object thereof is to provide a vehicle seat capable of ensuring the rigidity of a cushion frame while suppressing an increase in weight or size of the cushion frame.

Further, another object is to improve the rigidity of a cushion frame with respect to a compression force and an extension force generated simultaneously near a connection portion with respect to a seat back frame in the cushion frame when a seat back falls in the front to back direction by an input load.

Further, another object is to stably support a support shaft for supporting the other member or a rotary shaft for rotating the other member which is attached to a cushion frame and to maintain the distance between shafts when a plurality of shafts are attached to the cushion frame.

Further, another object is to improve the rigidity of a portion without the other member like a brake mechanism in a cushion frame and to improve the rigidity of a peripheral portion thereof and a portion with the other member.

Further, another object is to suppress an increase in size of a cushion frame while avoiding the interference with a gear of an elevation mechanism when the gear is disposed near the cushion frame in the case where a vehicle seat includes the elevation mechanism.

The above-described problem is solved by a vehicle seat of various embodiments of the invention. Here, the vehicle seat includes: a seat cushion which includes a cushion frame; a seat back which is connected to the cushion frame; an elevation mechanism which is driven to adjust the height of the seat cushion; and a brake mechanism which maintains the height of the seat cushion when the elevation mechanism is not driven, wherein the brake mechanism is connected to a second connection portion different from a first connection portion connected to the seat back in the cushion frame, and wherein a reinforcement portion which extends in a direction from the first connection portion toward the second connection portion is provided between the first connection portion and the second connection portion in the cushion frame.

In the above-mentioned vehicle seat, both the first connection portion connected to the seat back and the second connection portion connected to the brake mechanism in the cushion frame become high-rigid portions. On the contrary, the rigidity of the portion located between the connection portions is lower than that of the connection portions.

Therefore, in the above-mentioned vehicle seat, the low-rigid portion located between the first connection portion and the second connection portion is provided with the reinforcement portion which extends in a direction from the first connection portion toward the second connection portion. Accordingly, even when the input load is applied to the low-rigid portion, that is, the portion located between the connection portions in the cushion frame, the input load is transmitted to the high-rigid connection portion. Accordingly, the rigidity of the cushion frame may be ensured while suppressing an increase in weight or size of the cushion frame.

Further, in the above-mentioned vehicle seat, it is preferable that the cushion frame include side frames which are disposed at both ends of the vehicle seat in the width direction, it is preferable that the first connection portion, the second connection portion, and the reinforcement portion be provided in the side frame, it is preferable that the reinforcement portion include a first reinforcement portion and a second reinforcement portion located below the first reinforcement portion, and it is preferable that each of the first reinforcement portion and the second reinforcement portion be formed by depressing the side frame inward in the width direction.

In the above-described configuration, the reinforcement portions are provided to respectively correspond to the compression force and the extension force generated near the connection portion with respect to the seat back frame in the cushion frame when the seat back falls in the front to back direction by the input load. Accordingly, the rigidity of the cushion frame with respect to the compression force and the extension force is improved, and hence the deformation of the portion located between the first connection portion and the second connection portion in the side frame may be more effectively suppressed.

Further, it is preferable that the above-mentioned vehicle seat further include a reclining mechanism which rotates the seat back about a rotary shaft with respect to the seat cushion, it is preferable that the brake mechanism be provided in a driving force transmission mechanism which transmits a driving force to the elevation mechanism, it is preferable that the driving force transmission mechanism include a rotation shaft which rotates when the driving force is transmitted to the elevation mechanism, it is preferable that the rotary shaft be attached to the first connection portion, it is preferable that the rotation shaft be attached to the second connection portion, and it is preferable that the first reinforcement portion be provided between the rotary shaft and the rotation shaft in the side frame and extend in a direction from the rotary shaft toward the rotation shaft.

In the above-described configuration, the rigidity of the portion located between the rotation shaft of the driving force transmission mechanism and the rotary shaft of the reclining mechanism in the side frame is improved by the reinforcement effect obtained by the first reinforcement portion. Accordingly, since the shafts are stably supported by the side frame and the portion between the shafts is not easily deformed, the distance between the shafts is uniformly maintained.

Further, it is preferable that the above-mentioned vehicle seat further include a reclining mechanism which rotates the seat back about a rotary shaft with respect to the seat cushion, it is preferable that the elevation mechanism include a rotation body which rotates while being connected to the side frame when the height of the seat cushion is adjusted, it is preferable that a connection shaft which rotatably connects the rotation body to the side frame be attached to a third connection portion located between the first connection portion and the second connection portion in the side frame, it is preferable that the rotary shaft be attached to the first connection portion, and it is preferable that the second reinforcement portion be provided between the rotary shaft and the connection shaft in the side frame and extend in a direction from the rotary shaft toward the connection shaft.

With the above-described configuration, the rigidity of the portion located between the connection shaft of the rotation body and the rotary shaft of the reclining mechanism in the side frame is improved by the reinforcement effect obtained by the second reinforcement portion. Accordingly, since the shafts are stably supported by the side frame and the portion between the shafts is not easily deformed, the distance between the shafts is uniformly maintained.

Further, in the above-mentioned vehicle seat, it is preferable that a third reinforcement portion which is formed by bulging the side frame in a circular-arc shape outward in the width direction be provided between the first reinforcement portion and the second reinforcement portion in the side frame.

With the above-described configuration, since the rigidity of the portion located between the first reinforcement portion and the second reinforcement portion in the side frame is also improved, it is possible to more effectively suppress the deformation of the portion located between the first connection portion and the second connection portion in the side frame.

Further, in the above-mentioned vehicle seat, it is preferable that the third reinforcement portion extend to reach the second connection portion in the side frame.

With the above-described configuration, the reinforcement effect obtained by the third reinforcement portion also influences the second connection portion. Accordingly, not only the rigidity of the portion located between the first connection portion and the second connection portion in the side frame, but also the rigidity of the second connection portion are improved.

Further, in the above-mentioned vehicle seat, it is preferable that an end located near the second connection portion in the first reinforcement portion in the extension direction of the first reinforcement portion reach the second connection portion.

With the above-described configuration, the reinforcement effect obtained by the first reinforcement portion also influences the second connection portion. Accordingly, not only the rigidity of the portion located between the first connection portion and the second connection portion in the side frame, but also the rigidity of the second connection portion are improved.

Further, in the above-mentioned vehicle seat, it is preferable that the brake mechanism be provided in the driving force transmission mechanism which transmits the driving force to the elevation mechanism, it is preferable that the elevation mechanism include a second gear which engages with a first gear of the driving force transmission mechanism, it is preferable that the second gear be disposed at the inside of the side frame in the width direction, it is preferable that each of the first reinforcement portion and the second reinforcement portion be formed by depressing the side frame inward in the width direction, and it is preferable that at least one of the first reinforcement portion and the second reinforcement portion be disposed at a position facing the second gear.

In the above-described configuration, the second gear is disposed at the inside of the vehicle seat of the side frame in the width direction, and is located at a position facing at least one of the first reinforcement portion and the second reinforcement portion formed to be depressed inward in the width direction. Accordingly, an increase in size of the side frame may be suppressed while the second gear is disposed near the side frame. Further, since the second gear faces a portion of which the rigidity is improved by the reinforcement portion in the side frame, it is possible to suppress the second gear from being deformed so that the second gear falls outward in the width direction.

According to an embodiment, even when the input load is applied to the low-rigid portion, that is, the portion located between the connection portions in the cushion frame, the input load is transmitted to the high-rigid connection portion. As a result, the rigidity of the cushion frame may be ensured while suppressing an increase in weight or size of the cushion frame.

According to an embodiment, the rigidity of the cushion frame is improved with respect to the compression force and the extension force generated near the connection portion with respect to the seat back frame in the cushion frame when the seat back falls in the front to back direction by the input load. Accordingly, the deformation of the portion located between the first connection portion and the second connection portion in the side frame is suppressed.

According to an embodiment, the rigidity of the portion located between the rotation shaft of the driving force transmission mechanism and the rotary shaft of the reclining mechanism in the side frame is improved. Accordingly, the shafts are stably supported by the side frame, and the distance between the shafts is uniformly maintained.

According to an embodiment, the rigidity of the portion located between the connection shaft of the rotation body and the rotary shaft of the reclining mechanism in the side frame is improved. Accordingly, the shafts are stably supported by the side frame, and the distance between the shafts is uniformly maintained.

According to an embodiment, since the rigidity of the portion located between the first reinforcement portion and the second reinforcement portion in the side frame is improved, the deformation of the portion located between the first connection portion and the second connection portion in the side frame is more effectively suppressed.

According to an embodiment, not only the rigidity of the portion located between the first connection portion and the second connection portion in the side frame, but also the rigidity of the second connection portion are improved.

According to an embodiment, not only the rigidity of the portion located between the first connection portion and the second connection portion in the side frame, but also the rigidity of the second connection portion are improved.

According to an embodiment, an increase in size of the side frame is suppressed even while the second gear is disposed near the side frame. Further, it is possible to suppress the second gear from being deformed so that the second gear falls outward in the width direction.

DETAILED DESCRIPTION

Hereinafter, a vehicle seat according to an embodiment of the invention will be described with reference to FIGS. 1 to 8. Furthermore, the embodiment to be described below is merely an example used to help the easy comprehension of the invention, and does not limit the invention. That is, the shape, the dimension, and the arrangement of the components to be described below may be modified and improved without departing from the spirit of the invention, and the invention includes the equivalent thereof.

Figure 6:
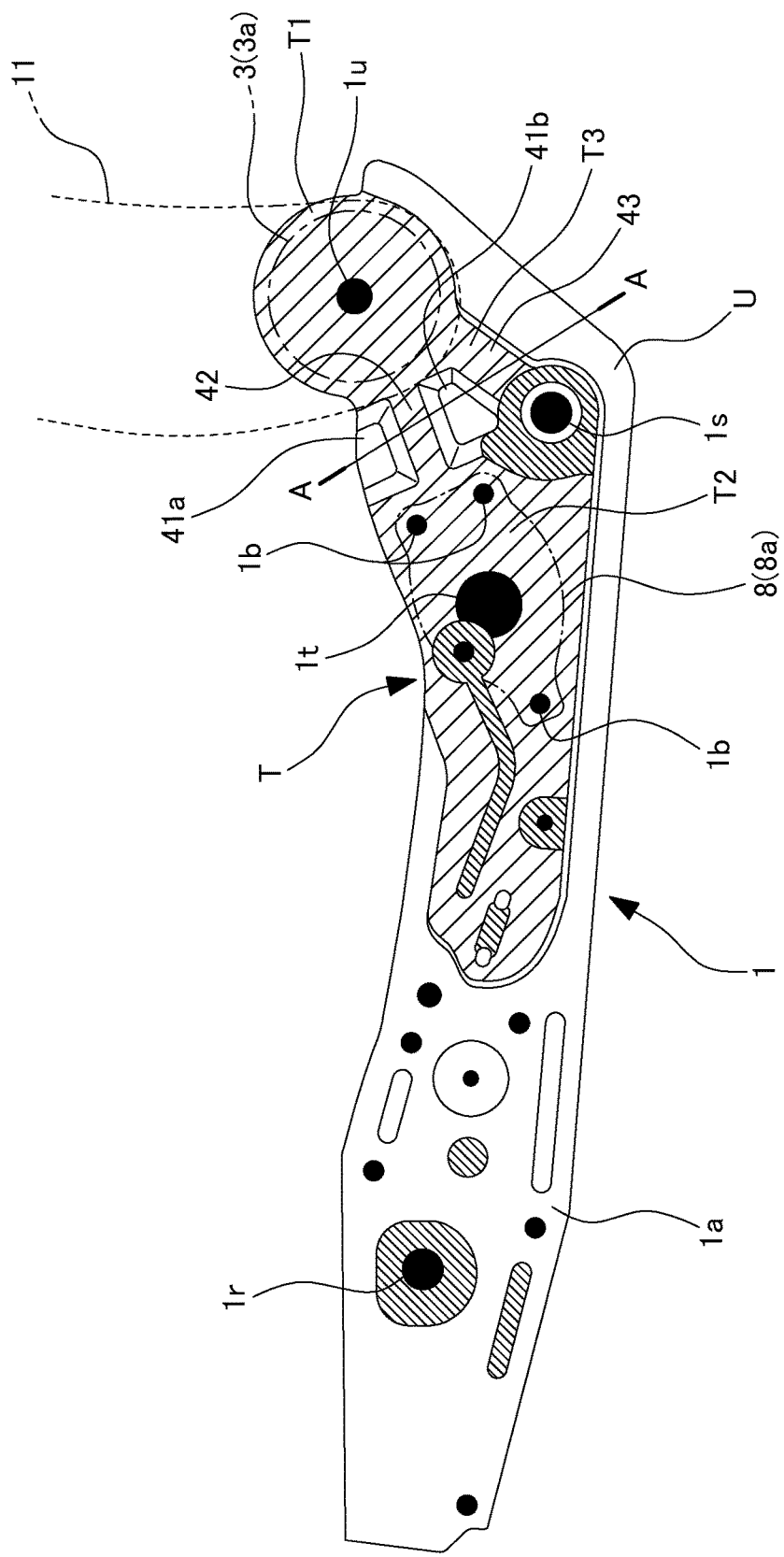
FIG. 6 is a side view diagram illustrating a side frame of the cushion frame according to the embodiment of the invention and is a diagram when viewed from the outside of the vehicle seat in the width direction.

Furthermore, in FIG. 6, the hatching position indicates a portion which is depressed inward in the width direction of the vehicle seat. Particularly, a portion in which the gap between the hatching lines is narrow indicates a portion in which the depression amount is relatively large. Further, in FIG. 6, the black position indicates a penetration hole.

In the description below, the front to back direction indicates a direction that matches the travel direction of the vehicle. Further, the width direction indicates a direction that follows the width of the vehicle. More specifically, the width direction corresponds to the width direction of the vehicle seat as the right and left direction. Further, the up and down direction indicates the up and down direction of the vehicle seat. Furthermore, in the description below, the position or the posture of each of the components of the seat will be described based on the normal state, that is, the state where an occupant sits on the seat unless otherwise specified.

First, a basic configuration of the vehicle seat and the seat frame (hereinafter, a main seat S and a main frame F) according to the embodiment of the invention will be described.

Figure 1:
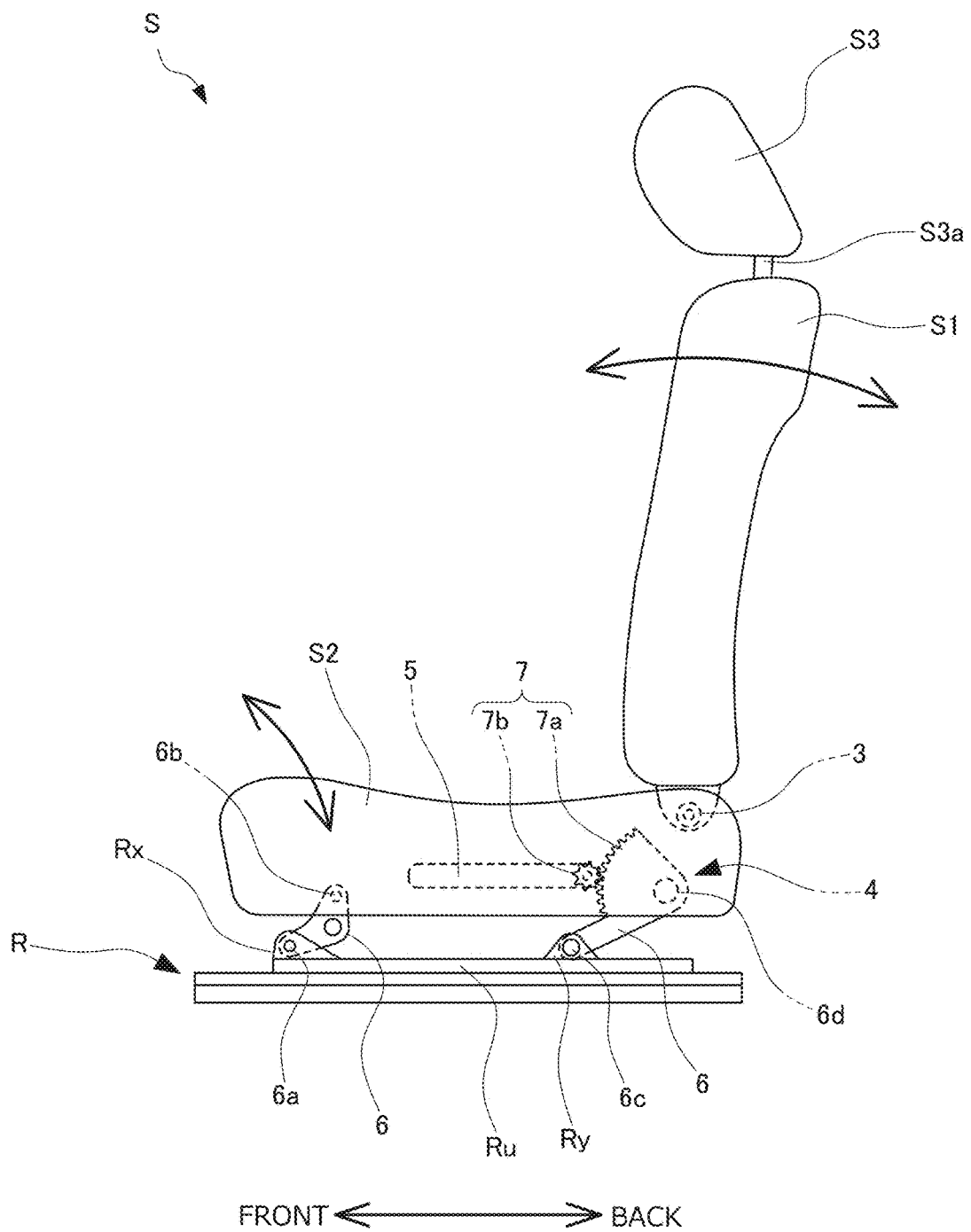
FIG. 1 is a schematic side view illustrating an appearance of a vehicle seat according to an embodiment of the invention.
Figure 2:
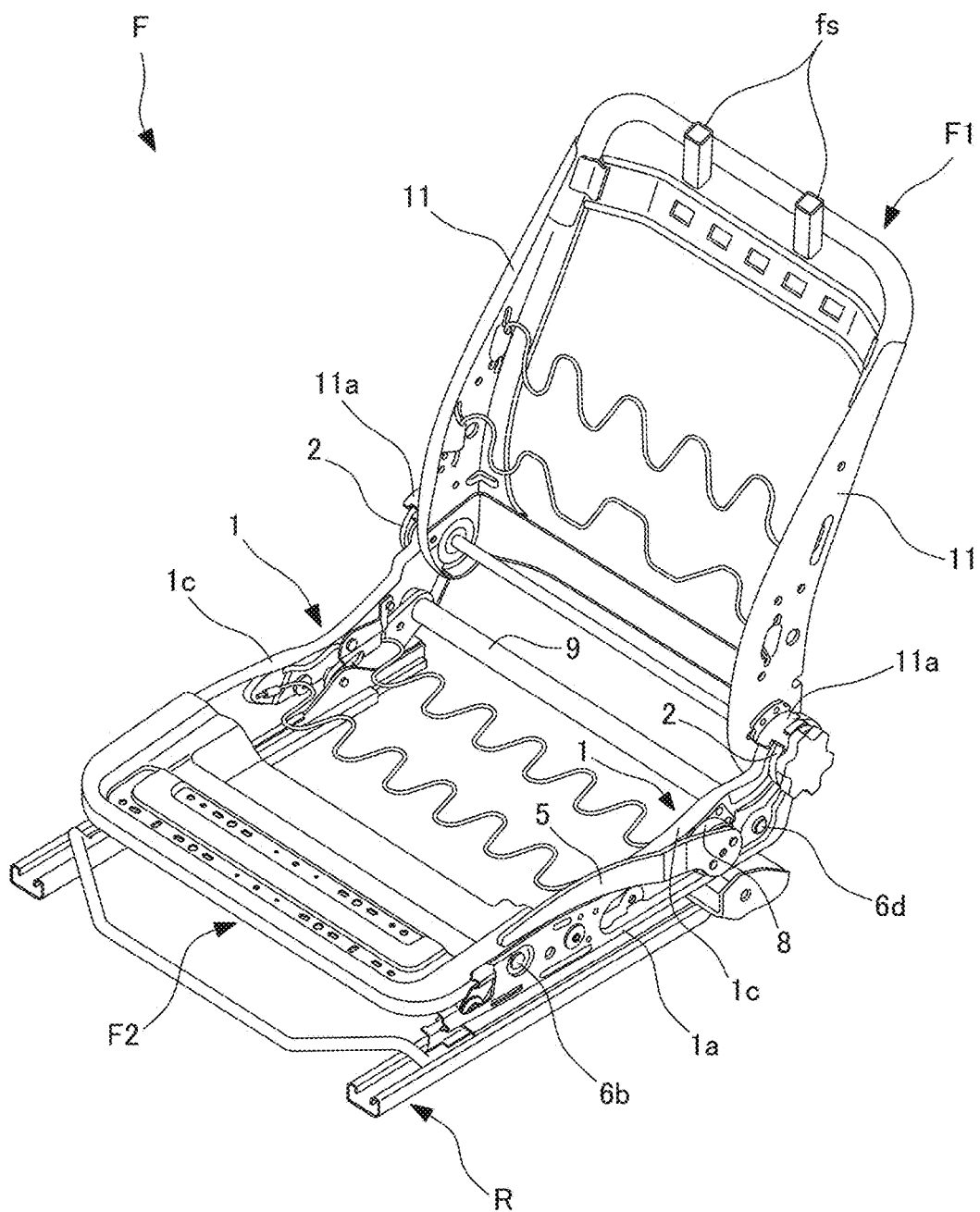
FIG. 2 is a perspective view illustrating an entire image of a seat frame of the vehicle seat according to the embodiment of the invention.
Figure 3:
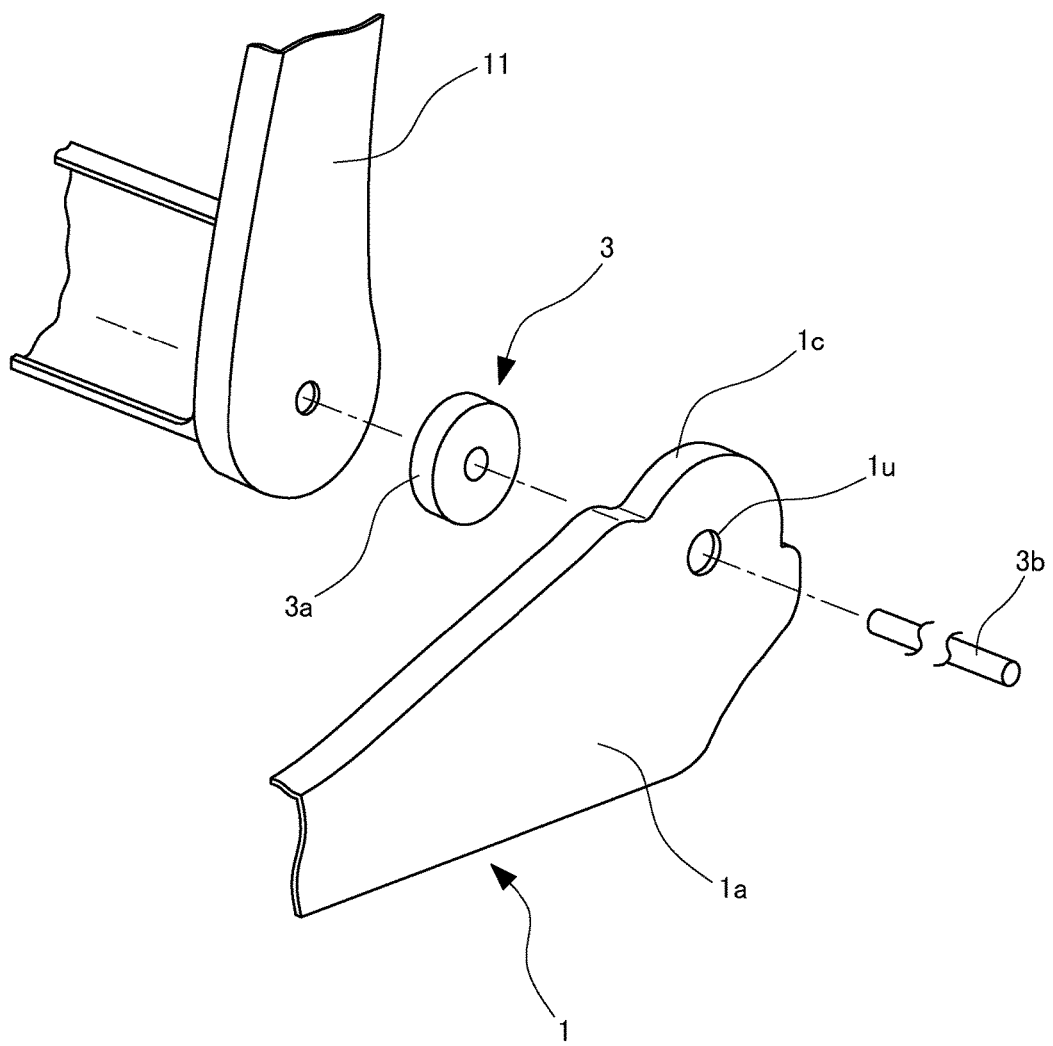
FIG. 3 is a perspective exploded view diagram illustrating an attachment position of a reclining mechanism according to the embodiment of the invention.

The main seat S substantially has the same basic structure as the generally known vehicle seat, and includes, as shown in FIG. 1, a seat back S1, a seat cushion S2, and a headrest S3 as main components. As shown in FIG. 2, the main frame F that constitutes the framework of the main seat S includes a back frame F1 of the seat back S1 and a cushion frame F2 of the seat cushion S2. Further, guide stays fs which support the body of the headrest S3 are fixed in a manner such that pillars S3a extending from the lower portion of the headrest S3 are inserted into the upper portion of the back frame F1.

Further, many parts of the main frame F are formed of a metal member and welding, particularly laser welding, is used as a method of bonding the components of the frame. As shown in FIG. 2, each of the back frame F1 and the cushion frame F2 which are assembled by the laser welding is constructed in a rectangular frame shape.

Then, a lower end of each of side portion frames 11 disposed at both ends of the back frame F1 in the width direction is assembled to a rear end of each of side frames 1 disposed at both ends of the cushion frame F2 in the width direction. Accordingly, the seat back S1 is connected to the rear end of the cushion frame F2. Furthermore, in the main frame F, the lower end of the side portion frame 11 is assembled to the rear end of the side frame 1 through a reclining mechanism 3 shown in FIG. 3.

The reclining mechanism 3 is operated in a manner such that an occupant manipulates a manipulation unit (not shown), and is used to rotate the seat back S1 so that the seat back falls forward or backward with respect to the seat cushion S2. In the main seat S, the reclining mechanism 3 is individually provided in each of the pair of right and left side portion frames 11, and is attached to the lower portion of the outer surface of the side portion frame 11 by laser welding. Further, the reclining mechanism 3 is welded to the rear end of the side frame 1 at the surface opposite to the welding side of the side portion frame 11.

Each reclining mechanism 3 has a generally known structure, and a driving mechanism (not shown) provided inside the main body is operated in a manner such that a penetration shaft 3b penetrating a reclining mechanism body 3a rotates. By the operation of the driving mechanism, a portion which is bonded to the side portion frame 11 of the back frame F1 in the reclining mechanism body 3a relatively rotates about the penetration shaft 3b with respect to the opposite portion, that is, a portion bonded to the side frame 1 of the cushion frame F2. Accordingly, the seat back S1 rotates about the penetration shaft 3b with respect to the seat cushion S2.

Here, the penetration shaft 3b corresponds to the rotary shaft when the seat back S1 rotates with respect to the seat cushion S2 by the reclining mechanism 3. Furthermore, as shown in FIG. 2, the penetration shaft 3b is used as a common shaft between the reclining mechanism 3 attached to one side portion frame 11 and the reclining mechanism 3 attached to the other side portion frame 11. That is, the penetration shaft 3b penetrates one side portion frame 11, extends in the width direction toward the other side portion frame 11, and further penetrates the side portion frame 11.

Then, as shown in FIG. 2, each of both ends of the penetration shaft 3b penetrates the corresponding reclining mechanism body 3a, and further penetrates the side frame 1 of the cushion frame F2 located near the reclining mechanism body 3a. That is, in the main seat S, the penetration shaft 3b is provided rotatably while penetrating the side portion frame 11 and the side frame 1 in the width direction.

Furthermore, the penetration shaft 3b may be rotated by a manipulation unit such as a lever manipulated by the occupant or may be rotated by power generated by a driving device such as an actuator. Further, as shown in FIG. 2, a spiral leaf spring 2 may be disposed at the outside of the portion through which the penetration shaft 3b penetrates in the side frame 1 in the width direction. One end of the leaf spring 2 is locked to the end of the penetration shaft 3b, and the other end thereof is locked to a locking bracket 11a which is provided to protrude from the outer surface of the side portion frame 11. Accordingly, the leaf spring 2 biases the seat back S1 forward, and the seat back S1 may be returned by the biasing force to an original state (a state before the backward inclining operation) from the backward inclined state by the reclining mechanism 3.

Further, the main seat S includes a slide rail mechanism R on which the seat body is placed other than the seat body including the seat back S1, the seat cushion S2, and the headrest S3. By the slide rail mechanism R, the seat body is movable in the front to back direction with respect to a vehicle body floor.

Further, the main seat S includes a height adjustment mechanism 4 as an elevation mechanism between the slide rail mechanism R and the seat cushion S2 in the up and down direction. The height adjustment mechanism 4 is used to adjust the height of the seat body including the seat cushion S2, and is operated in a manner such that a manipulation lever 5 shown in FIGS. 1 and 2 is manipulated by the occupant.

The configuration of the height adjustment mechanism 4 will be described. That is, the height adjustment mechanism 4 includes a rotation link 6 which rotates about the shaft along the width direction. The rotation link 6 connects the side frame 1 of the cushion frame F2 to an upper rail Ru of the slide rail mechanism R. Then, when the rotation link 6 rotates while being connected to the side frame 1, the height of the seat cushion S2, that is, the seat height is adjusted.

Furthermore, in the main seat S, the rotation link 6 is provided at each of the front and rear portions of each side frame 1, and all rotation links 6 are connected to the side frames 1 while being disposed at the inside in the width direction in relation to the side frames 1.

Among the rotation links 6 which are connected to the side frames 1, as shown in FIG. 1, one end of the front rotation link 6 is connected to a link support portion Rx protruding upward from the front portion of the upper surface of the upper rail Ru through a connection shaft 6a. Then, the front rotation link 6 is rotatable about the connection shaft 6a. Further, the other end of the front rotation link 6 is connected to the front end of the side frame 1 through a connection shaft 6b. A shaft hole 1r shown in FIG. 6 is formed in the front end of the side frame 1, and the connection shaft 6b is inserted through such a shaft hole 1r. Then, the front rotation link 6 is rotatable about the connection shaft 6b.

Figure 4:
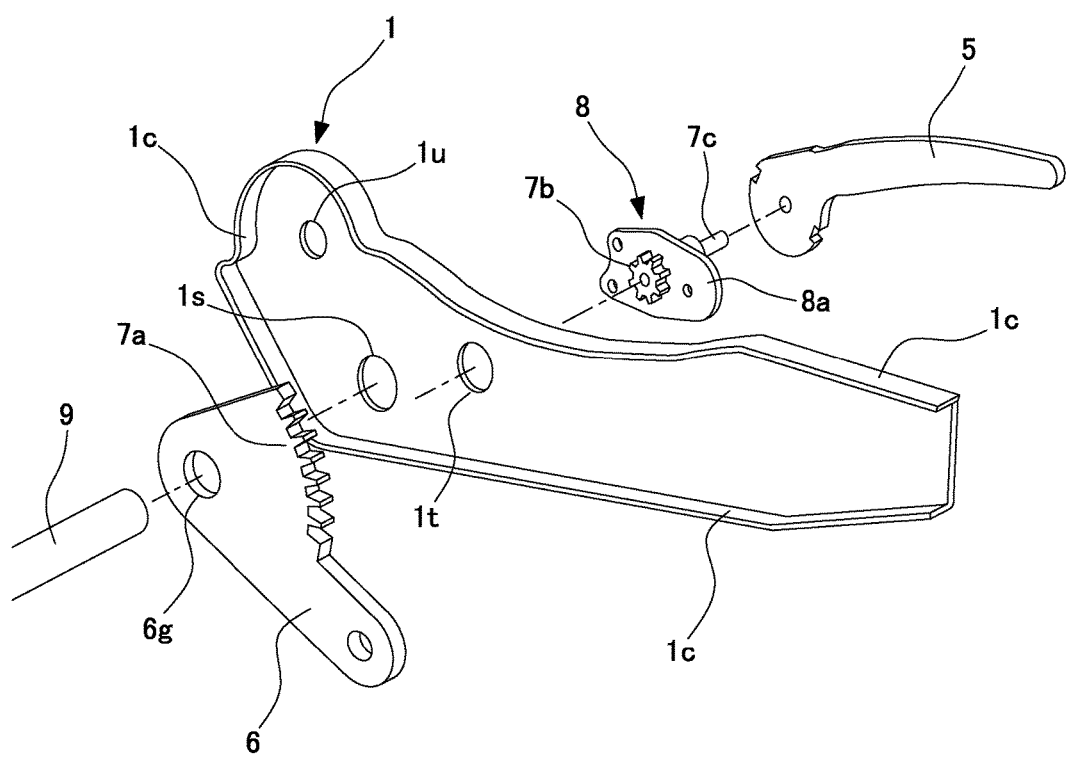
FIG. 4 is a schematic perspective exploded diagram illustrating a configuration of a driving force transmission mechanism according to the embodiment of the invention.

Similarly, the rear rotation link 6 corresponds to the rotation body, and is connected to a link support portion Ry protruding upward from the rear portion of the upper surface of the upper rail Ru through a connection shaft 6c. Then, the rear rotation link 6 is rotatable about the connection shaft 6c. Further, the other end of the rear rotation link 6 is connected to the rear end of the side frame 1 through a connection shaft 6d. A shaft hole 1s shown in FIGS. 4 and 6 is formed in the rear end of the side frame 1, and the connection shaft 6d is inserted into such a shaft hole 1s. Then, the rear rotation link 6 is rotatable about the connection shaft 6d. In other words, the connection shaft 6d corresponds to the connection shaft used to rotatably connect the rear rotation link 6 to the side frame 1.

Furthermore, in the main seat S, a pipe member is used as the connection shaft 6d that connects the rear rotation link 6 to the rear end of the side frame 1. Specifically, in the main seat S, as shown in FIG. 2, a connection pipe 9 which connects the pair of right and left side frames 1 serves as the connection shaft 6d. That is, in the main seat S, the connection shaft 6d which connects the rear rotation link 6 at one end side (the left side) in the width direction to the side frame 1 and the connection shaft 6d which connects the rear rotation link 6 at the other end side (the right side) in the width direction to the side frame 1 becomes a common shaft.

More specifically, as shown in FIG. 4, the rear rotation link 6 is provided with a pipe penetration hole 6g through which the connection pipe 9 is inserted, and the rear end of the side frame 1 is provided with the shaft hole 1s as described above. Then, both ends of the connection pipe 9 in the extension direction are respectively inserted into the pipe penetration hole 6g formed in the rear rotation link 6 and the shaft hole 1s formed in the rear end of the side frame 1. Accordingly, the rear rotation link 6 is rotatable to slide on the outer peripheral surface along the outer peripheral surface of the connection pipe 9. Both ends of the connection pipe 9 in the extension direction slightly protrude outward in the width direction from the above-described shaft hole 1s, and are fixed to the side frame 1 while the protruding portions are caulked.

As described above, the height adjustment mechanism 4 including the plurality of rotation links 6 adjusts the seat height in a manner such that the rotation links 6 rotate in the same direction together. Here, as described above, the height adjustment mechanism 4 is operated in a manner such that the occupant manipulates the manipulation lever 5. That is, a driving force is generated when the occupant manipulates the manipulation lever 5, and the height adjustment mechanism 4 is driven when the driving force is transmitted to the height adjustment mechanism 4. Then, the main seat S is provided with a driving force transmission mechanism 7 that transmits the driving force from the manipulation lever 5 to the height adjustment mechanism 4.

Figure 5:
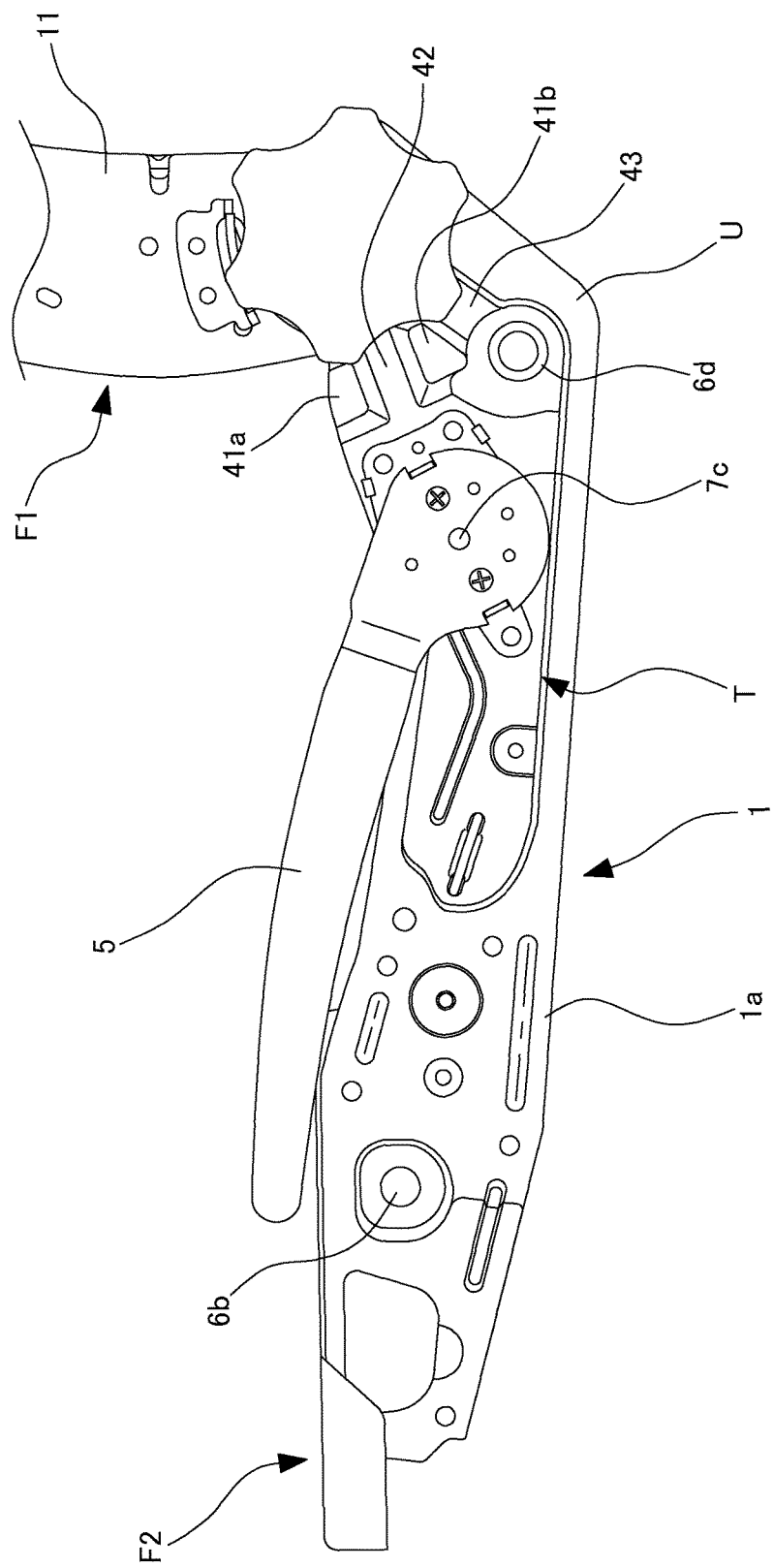
FIG. 5 is a schematic side view illustrating a cushion frame according to the embodiment of the invention.

The driving force transmission mechanism 7 is disposed at one end side of the seat cushion S2 in the width direction. More specifically, the driving force transmission mechanism is disposed near a door in the vicinity thereof, and is assembled to the side frame 1 as shown in FIGS. 4 and 5. Further, as shown in the same drawing, the driving force transmission mechanism 7 mainly includes a sector gear 7a, a pinion gear 7b as a first gear, a gear rotation shaft 7c as a rotation shaft, and a brake mechanism 8 as main components.

The above-described manipulation lever 5 is attached to the end of the gear rotation shaft 7c, and is rotated by the manipulation of the manipulation lever 5. The pinion gear 7b is attached to an end opposite to the attachment side of the manipulation lever 5 in the gear rotation shaft 7c, and the gear 7b is rotated with the rotation of the gear rotation shaft 7c. Furthermore, the manipulation lever 5 is disposed at the outside of the side frame 1 in the width direction, and the pinion gear 7b is disposed at the inside of the side frame 1 in the width direction. Further, the gear rotation shaft 7c which connects the manipulation lever 5 to the pinion gear 7b is inserted through a shaft hole 1t formed in the side frame 1 and shown in FIGS. 4 and 6, and penetrates the side frame 1.

Here, the pinion gear 7b engages with the sector gear 7a. Then, when the pinion gear 7b rotates, the engagement position with respect to the pinion gear 7b in the sector gear 7a changes in the up and down direction.

As shown in FIG. 4, the above-mentioned sector gear 7a is integrated with the rotation link 6 constituting the height adjustment mechanism 4, that is, the rear rotation link 6 in the main seat S. That is, the sector gear 7a corresponds to the second gear provided in the height adjustment mechanism 4, and is formed in a portion that protrudes in a fan shape from the rear rotation link 6 toward the pinion gear 7b to engage with the pinion gear 7b. Furthermore, since the rear rotation link 6 is disposed at the inside of the side frame 1 in the width direction, the sector gear 7a which is integrated with the rear rotation link 6 is also disposed at the inside of the side frame 1 in the width direction.

With the above-described configuration, the gear rotation shaft 7c rotates when the manipulation lever 5 is manipulated, and the driving force is transmitted to the height adjustment mechanism 4. In other words, the gear rotation shaft 7c rotates when the driving force is transmitted to the height adjustment mechanism 4. Specifically, the gear rotation shaft 7c rotates together with the pinion gear 7b. In accordance with this movement, the engagement position between the pinion gear 7b and the sector gear 7a changes in the up and down direction. As a result, the rear rotation link 6 in which the sector gear 7a is formed rotates, and then the other rotation links 6 also rotate in a following manner. By the above-described series of operations, the seat body including the seat cushion S2 is elevated, and hence the seat height is adjusted.

Incidentally, as described above, the driving force transmission mechanism 7 includes the brake mechanism 8, but the brake mechanism 8 is used to maintain the seat height when the height adjustment mechanism 4 is not driven, that is, the manipulation lever 5 is not manipulated. More specifically, as shown in FIG. 4, the brake mechanism 8 is attached to the gear rotation shaft 7c between the manipulation lever 5 and the pinion gear 7b. Then, a brake mechanism body (not shown) provided inside a casing 8a applies a friction force to the gear rotation shaft 7c penetrating the casing 8a. Accordingly, the seat height is maintained by the regulation of the unintended rotation of the gear rotation shaft 7c when the manipulation lever 5 is not manipulated.

Furthermore, although the description for the configuration of the brake mechanism body is not presented, any known configuration may be used without any limitation as long as the gear rotation shaft 7c is not rotatable when the manipulation lever 5 is not manipulated.

Further, in the main seat S, the side frame 1 is provided with a bolt hole 1b shown in FIG. 6, and the side frame 1 is connected to the brake mechanism 8 by a bolt (not shown) inserted into the bolt hole 1b. Here, a portion connected to the brake mechanism 8 in the side frame 1 is formed as a portion different from a portion connected to the seat back S1, that is, a portion to which the back frame F1 is assembled. The portion connected to the brake mechanism 8 in the side frame 1 and the portion connected to the seat back S1 will be described in detail later.

Next, a configuration example of the side frame 1 will be described. Furthermore, the side frame 1 is disposed at both ends of the cushion frame F2 in the width direction, but both side frames 1 have substantially the same configuration except that the above-described driving force transmission mechanism 7 is disposed only at one side frame 1. For this reason, a configuration example of only the side frame 1 provided with the driving force transmission mechanism 7 will be described.

The side frame 1 is an elongated member in the front to back direction, and is formed by processing one sheet metal member in the main seat S. As described above, the seat back S1, that is, the lower end of each of the side portion frames 11 provided at both ends of the back frame F1 in the width direction is connected to the side frame 1. Furthermore, the portion connected to the seat back S1 in the side frame 1 is located at the rear end of the side frame 1. Specifically, the portion connected to the seat back S1 in the side frame 1 indicates a portion that protrudes in a semi-circular shape from the upside of the rear end of the side frame 1 and a portion located below the portion. That is, the portion indicates a portion that overlaps the back frame F1 indicated by the dotted line in FIG. 6 in the width direction.

Further, as shown in FIGS. 2 and 4, the substantially entire area of the upper end of the side frame 1 is provided with a flange 1c which is bent inward in the width direction, and hence the rigidity of the side frame 1 is ensured. Similarly, the substantially entire area of the lower end of the side frame 1 is also provided with the flange 1c which is bent inward in the width direction. Further, the flanges 1c which are respectively formed at the upper and lower ends of the side frame 1 are connected to each other by the flange 1c formed at the rear end of the side frame 1. In this way, since the flange 1c is continuously formed along the outer periphery of the side frame 1, the rigidity of the side frame 1 may be further improved.

Further, an irregular processing is performed on the sheet metal forming the side frame 1 in order to further reinforce the side frame 1, and as shown in FIG. 6, an area (hereinafter, the depressed area) which is depressed inward in the width direction is formed in the side frame 1. The depressed area will be described. A depressed area is formed so that an area (hereinafter, a non-depressed area) which is not depressed slightly remains at the lower end in the range from the portion connected to the seat back S1 to the center portion in the front to back direction in the side frame 1.

In the main seat S, the depressed area is dotted even in a range other than the above-described range in the side frame 1. For example, the depressed area is also formed in a portion which is located at a position slightly behind the front end of the side frame 1 and is located substantially at the center of the side frame 1 in the height direction.

Further, a floating island area of which the periphery is surrounded by the depressed area is formed in a range adjacent to the portion connected to the seat back S1 at the front side in the side frame 1. The floating island area is formed by bulging the side frame 1 outward in the width direction, and is formed at two positions in the main seat S. One bulged area 41a is located at a position adjacent to the protruding portion at the front side of the semi-cylindrical protruding portion formed in the rear end of the side frame 1. The other bulged area 41b is located at a position extending obliquely backward when viewed from the bulged area 41a.

Then, as shown in FIG. 6, a plurality of penetration holes are dotted in the side frame 1, and some of the plurality of penetration holes are used to connect the other components to the side frame 1. For example, one of the penetration holes is the shaft hole 1r through which the connection shaft 6b connecting the side frame 1 to the front rotation link 6 is inserted. Furthermore, as shown in FIG. 6, the shaft hole 1r is provided in the side frame 1 while the periphery is surrounded by the depressed area.

Further, the second penetration hole is the shaft hole 1s through which the connection shaft 6d (more specifically, the connection pipe 9) connecting the side frame 1 to the rear rotation link 6 is inserted. Furthermore, the shaft hole 1s is formed in an area of which the depression amount is larger than those of the other areas in the depressed area formed from the portion connected to the seat back S1 to the center portion in the front to back direction in the side frame 1.

Further, the third penetration hole is the shaft hole 1t through which the gear rotation shaft 7c of the driving force transmission mechanism 7 is inserted, and is substantially formed at the center portion of the depressed area formed from the portion connected to the seat back S1 to the center portion of the front to back direction in the side frame 1. Furthermore, the above-described brake mechanism 8 is set in the periphery of the shaft hole 1t, that is, a range indicated by the one-dotted chain line in FIG. 6. Then, a bolt (not shown) used to connect the brake mechanism 8 to the side frame 1 is attached to the bolt hole 1b provided in the vicinity of the shaft hole 1t.

Further, the fourth penetration hole is a shaft hole 1u through which the penetration shaft 3b of the reclining mechanism 3 is inserted, and is formed in the portion connected to the seat back S1 in the side frame 1. Furthermore, the portion provided with the shaft hole 1u exists inside the depressed area as shown in FIG. 6.

As described above, the seat back S1, the reclining mechanism 3, the brake mechanism 8, and the rotation link 6 are connected to the side frame 1, and are connected to the depressed area of the side frame 1 in the main seat S. Hereinafter, the structure of the side frame 1 will be described again by mentioning the positional relation of the portion connected to the other seat constituting member like the seat back S1 in the side frame 1. Furthermore, in the description below, the depressed area which is formed from the portion connected to the seat back S1 to the center portion of the front to back direction in the side frame 1 will be referred to as a rear depressed area T.

In other words, the rear end of the rear depressed area T, that is, the portion connected to the seat back S1, is a portion connected to the seat back S1 in the cushion frame F2, and corresponds to the first connection portion T1. Then, as described above, the rear end of the rear depressed area T is provided with the shaft hole 1u through which the penetration shaft 3b of the reclining mechanism 3 is inserted. That is, in the main seat S, the penetration shaft 3b of the reclining mechanism 3 is attached to the rear end of the rear depressed area T corresponding to the first connection portion T1.

As described above, the center portion of the rear depressed area T is a portion connected to the brake mechanism 8. In other words, the center portion of the rear depressed area T is a portion connected to the brake mechanism 8 in the cushion frame F2, and corresponds to the second connection portion T2. Furthermore, the rear end of the rear depressed area T corresponding to the first connection portion T1 and the center portion of the rear depressed area T corresponding to the second connection portion T2 in the side frame 1 are formed as different portions.

Then, as described above, the center portion of the rear depressed area T is provided with the shaft hole 1t through which the gear rotation shaft 7c the driving force transmission mechanism 7 is inserted. That is, in the main seat S, the gear rotation shaft 7c of the driving force transmission mechanism 7 is attached to the center portion of the rear depressed area T corresponding to the second connection portion T2.

As shown in FIG. 6, a portion which is located between the rear end and the center portion in the rear depressed area T is inclined downward as it goes forward. As described above, the lower end of the inclined portion is further depressed by the inside in the width direction, and the portion is provided with the shaft hole 1s through which the connection shaft 6d connected to the rear rotation link 6 is inserted. That is, the inclined portion which is located between the rear end and the center portion in the rear depressed area T corresponds to the third connection portion T3, and the connection shaft 6d for rotatably connecting the rear rotation link 6 to the side frame 1 in the main seat S is attached to the inclined portion of the rear depressed area T corresponding to the third connection portion T3.

Further, as shown in FIG. 6, the bulged areas 41a and 41b having a floating island shape are disposed at the inclined portion of the rear depressed area T. One bulged area 41a is disposed at the upper edge of the outer surface 1a of the side frame 1. The other bulged area 41b is disposed at a position interposed between one bulged area 41a and a portion (hereinafter, an adjacent non-depressed area U) which is adjacent to the inclined portion in the non-depressed area formed at the lower end of the side frame 1.

That is, in the main seat S, the bulged areas 41a and 41b and the adjacent non-depressed area U exist as the portions which serve as the relative convex portions in the side frame 1. In other words, a portion which is interposed between the bulged areas 41a and 41b in the side frame 1 is formed as a reinforcement portion which becomes a relative concave portion and improves the rigidity of the side frame 1. Similarly, even a portion which is interposed between the bulged area 41b and the adjacent non-depressed area U in the side frame 1 is formed as a reinforcement portion which becomes a relative concave portion and improves the rigidity of the side frame 1.

Here, the reinforcement portion which is disposed between the bulged areas 41a and 41b corresponds to the first reinforcement portion, and hereinafter will be referred to as an upper reinforcement portion 42, and the reinforcement portion which is disposed between the bulged area 41b and the adjacent non-depressed area U corresponds to the second reinforcement portion and hereinafter will be referred to as a lower reinforcement portion 43. As shown in FIG. 6, the lower reinforcement portion 43 is located below the upper reinforcement portion 42.

Furthermore, in the main seat S, two reinforcement portions are provided, but the number of the reinforcement portions is not particularly limited as long as the two reinforcement portions (the first reinforcement portion and the second reinforcement portion) are included.

The upper reinforcement portion 42 and the lower reinforcement portion 43 are a part of the rear depressed area T, and are formed by depressing the side frame 1 inward in the width direction. Further, the upper reinforcement portion 42 and the lower reinforcement portion 43 are respectively disposed between the rear end and the center portion of the rear depressed area T in the side frame 1, and extend in a direction from the rear end toward the center portion.

In this way, in the main seat S, the reinforcement portion is provided between the portion connected to the seat back S1 (that is, the first connection portion T1) and the portion connected to the brake mechanism 8 (that is, the second connection portion T2) in the side frame 1. Accordingly, in the main seat S, the deformation of the side frame 1 may be suppressed.

More specifically, since the first connection portion T1 or the second connection portion T2 of the side frame 1 is a portion connected to the seat back S1 or the brake mechanism 8, the rigidity of the connection portion is comparatively high. In contrast, the rigidity of the portion which is located between the first connection portion T1 and the second connection portion T2 in the side frame is lower than those of two connection portions T1 and T2. Therefore, in the main seat S, the reinforcement portion is provided between the first connection portion T1 and the second connection portion T2. Accordingly, the rigidity of the low-rigid portion between the first connection portion T1 and the second connection portion T2 is also ensured. As a result, the deformation of the side frame 1 is suppressed.

Further, the reinforcement portion which is provided between the first connection portion T1 and the second connection portion T2 extends in a direction from the first connection portion T1 toward the second connection portion T2. For this reason, when an input load is applied to the low-rigid portion between the first connection portion T1 and the second connection portion T2, the input load is transmitted from the low-rigid portion to the connection portions T1 and T2. Accordingly, it is possible to suppress a problem in which the input load is continuously applied to the low-rigid portion so that the side frame 1 is deformed.

Then, since the side frame 1 is not easily deformed, the load is satisfactorily transmitted from the side frame 1. Specifically, when a load is input to the seat back S1 in the main seat S, the input load is transmitted to the portion connected to the seat back S1 in the side frame 1, that is, the first connection portion T1 through the reclining mechanism 3. Here, it is desirable to release the load transmitted to the side frame 1 to the rear rotation link 6. For this reason, when the deformation of the side frame 1 is suppressed, the load which is transmitted from the seat back S1 to the side frame 1 may be satisfactorily transmitted to the rear rotation link 6.

Further, in the main seat S, two reinforcement portions which are deviated from each other in the up and down direction extend in a direction from the first connection portion T1 toward the second connection portion T2. Accordingly, it is possible to handle both the compression force and the extension force generated simultaneously in the side frame 1 when a load is applied to the seat back S1 in the front to back direction.

Figure 7A:
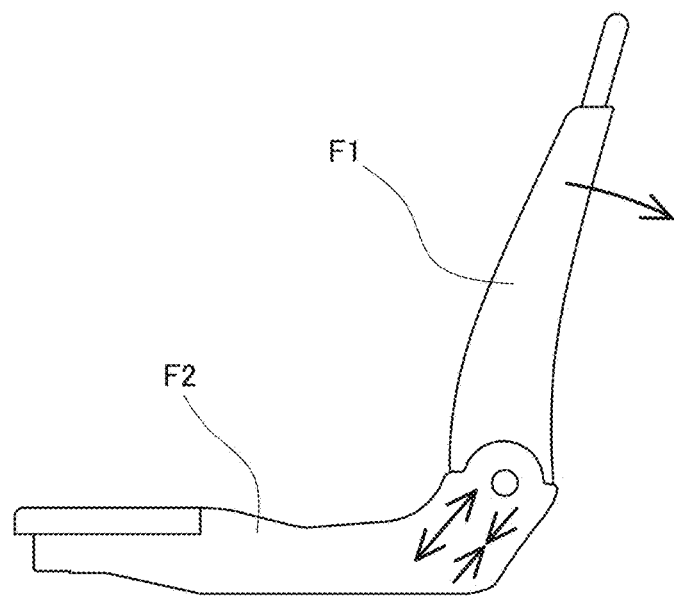
FIG. 7A is a side view diagram illustrating a state where a load is applied to a seat back from the front side and FIG. 7B is a side view diagram illustrating a state where a load is applied to the seat back from the rear side.
Figure 7B:
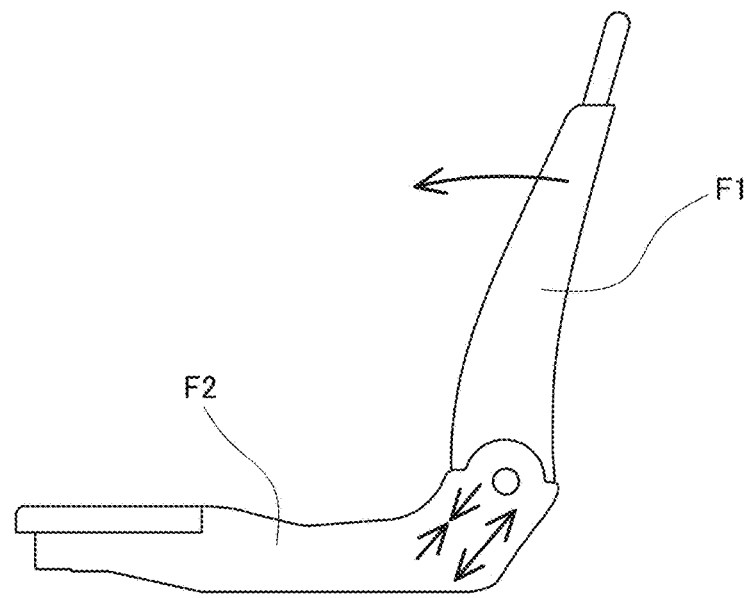

Specifically, as shown in FIGS. 7A and 7B, for example, when a backward load is applied to the seat back S1, the seat back S1 is inclined backward. At this time, the input load is transmitted from the seat back S1 to the portion connected to the seat back S1 in the side frame 1, that is, the first connection portion T1 through the reclining mechanism 3. When the load is transmitted in such a way, as shown in FIG. 7A, the compression force that compresses the lower side of the portion and the extension force that extends the upper side of the portion are generated simultaneously in the periphery of the first connection portion T1 in the side frame 1, that is, the portion between the first connection portion T1 and the second connection portion T2. These forces are exerted in a direction from the first connection portion T1 toward the second connection portion T2.

Further, when a forward load is input to the seat back S1, the seat back S1 is inclined forward. At this time, the input load is transmitted from the seat back S1 to the first connection portion T1 of the side frame 1 through the reclining mechanism 3. Accordingly, as shown in FIG. 7B, the compression force that compresses the upper side of the portion and the extension force that extends the lower side of the portion are generated simultaneously in the portion which is located between the first connection portion T1 and the second connection portion T2 in the side frame 1. These forces are exerted in a direction from the first connection portion T1 toward the second connection portion T2.

In contrast, two reinforcement portions which are deviated from each other in the up and down direction are provided at the portion between the first connection portion T1 and the second connection portion T2 of the side frame 1 in the main seat S. Further, the reinforcement portions extend in a direction from the first connection portion T1 toward the second connection portion T2. For this reason, even when the compression force and the extension force are simultaneously generated, the deformation of the side frame 1 may be effectively suppressed by the effect of the reinforcement portions respectively corresponding to the forces.

More specifically, when the backward load is input to the seat back S1, the upper reinforcement portion 42 corresponds to the extension force, and the lower reinforcement portion 43 corresponds to the compression force. Further, when the forward load is input to the seat back S1, the upper reinforcement portion 42 corresponds to the compression force, and the lower reinforcement portion 43 corresponds to the extension force. In this way, even when two kinds of forces are simultaneously generated in the opposite directions to each other, it is possible to effectively suppress the deformation of the side frame 1 by the two kinds of forces since the reinforcement portions respectively corresponding to the two kinds of forces are individually provided.

Further, in the main seat S, as described above, the upper reinforcement portion 42 is located between the first connection portion T1 and the second connection portion T2 in the side frame 1, and extends in a direction from the first connection portion T1 toward the second connection portion T2.

In other words, the upper reinforcement portion 42 is provided between the penetration shaft 3b of the reclining mechanism 3 and the gear rotation shaft 7c of the driving force transmission mechanism 7 in the side frame 1, and extends in a direction from the penetration shaft 3b toward the gear rotation shaft 7c. In this way, since the upper reinforcement portion 42 is provided between the penetration shaft 3b and the gear rotation shaft 7c, the rigidity of the portion located between the two shafts 3b and 7c in the side frame 1 is improved. As a result, the shafts 3b and 7c are stably supported by the side frame 1. Moreover, since the portion located between the penetration shaft 3b and the gear rotation shaft 7c is not easily deformed, the distance between the shafts is uniformly maintained.

Further, in the main seat S, the upper reinforcement portion 42 and the portion connected to the brake mechanism 8 in the side frame 1, that is, the second connection portion T2 both exist inside the rear depressed area T, and the upper reinforcement portion 42 extends to be continuous to the second connection portion T2. In other words, the end located near the second connection portion T2 in the extension direction of the upper reinforcement portion 42 in the upper reinforcement portion 42 reaches the second connection portion T2. Accordingly, the reinforcement effect obtained by the upper reinforcement portion 42 also influences the second connection portion T2. Thus, not only the rigidity of the portion located between the first connection portion T1 and the second connection portion T2 in the side frame 1, but also the rigidity of the second connection portion T2 are improved.

In the main seat S, the lower reinforcement portion 43 is also located between the first connection portion T1 and the second connection portion T2 in the side frame 1, and extends in a direction from the first connection portion T1 toward the second connection portion T2. More specifically, the lower reinforcement portion 43 is located between the first connection portion T1 in the side frame 1 and the portion provided with the shaft hole 1s for the connection shaft 6d connected to the rear rotation link 6, that is, the third connection portion T3. Then, the lower reinforcement portion 43 extends in a direction from the first connection portion T1 toward the third connection portion T3.

In other words, the lower reinforcement portion 43 is provided between the penetration shaft 3b of the reclining mechanism 3 and the connection shaft 6d in the side frame 1, and extends in a direction from the penetration shaft 3b toward the connection shaft 6d. In this way, since the lower reinforcement portion 43 is provided between the penetration shaft 3b and the connection shaft 6d, the rigidity of the portion located between the two shafts 3b and 6d in the side frame is improved. As a result, the shafts 3b and 6d are stably supported by the side frame 1. Moreover, since the portion located between the penetration shaft 3b and the connection shaft 6d is not easily deformed, the distance between the shafts is uniformly maintained.

Further, since the lower reinforcement portion 43 extends in a direction from the penetration shaft 3b toward the connection shaft 6d, the load which is transmitted from the seat back S1 to the side frame 1 is transmitted to the rear rotation link 6 through the lower reinforcement portion 43. That is, the lower reinforcement portion 43 is used to regulate the transmission direction of the load transmitted to the side frame 1 in addition to the purpose of improving the rigidity of the side frame 1. Since the lower reinforcement portion 43 is provided, the load is more smoothly transmitted from the side frame 1 to the rear rotation link 6.

Further, in the main seat S, the end located near the third connection portion T3 in the lower reinforcement portion 43 in the extension direction of the lower reinforcement portion 43 reaches the third connection portion T3. Accordingly, the reinforcement effect obtained by the lower reinforcement portion 43 also influences the third connection portion T3. Thus, not only the rigidity of the portion located between the first connection portion T1 and the second connection portion T2 in the side frame 1, but also the rigidity of the third connection portion T3 are improved.

Figure 8:
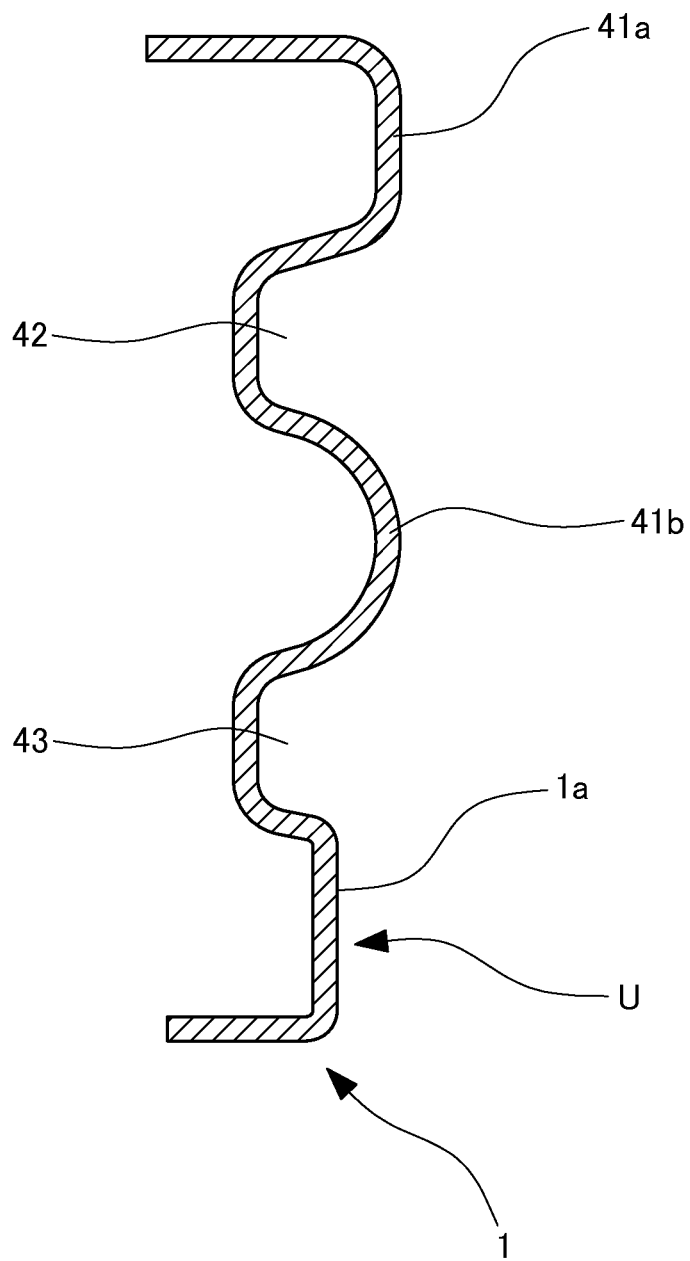
FIG. 8 is a cross-sectional view taken along the line A-A of FIG. 6.

Incidentally, in the main seat S, the bulged area 41b is provided between the upper reinforcement portion 42 and the lower reinforcement portion 43 in the side frame 1. The bulged area 41b corresponds to the third reinforcement portion of the invention, and is formed by bulging the side frame 1 in a circular-arc shape outward in the width direction as shown in FIG. 8. Since the bulged area 41b is provided, the rigidity of the portion located between the upper reinforcement portion 42 and the lower reinforcement portion 43 in the side frame 1 is also improved. As a result, it is possible to more effectively suppress the deformation of the portion located between the first connection portion T1 and the second connection portion T2 in the side frame 1.

Further, as shown in FIG. 6, the bulged area 41b extends in a direction from the first connection portion T1 toward the second connection portion T2 as in the upper reinforcement portion 42 or the lower reinforcement portion 43. Furthermore, in the main seat S, the bulged area 41b extends so that the end where the second connection portion T2 is located in the extension direction reaches the second connection portion T2. Accordingly, the reinforcement effect obtained by forming the bulged area 41b also influences the second connection portion T2. Thus, not only the rigidity of the portion located between the first connection portion T1 and the second connection portion T2 in the side frame 1, but also the rigidity of the second connection portion T2 are improved.

Figure 9:
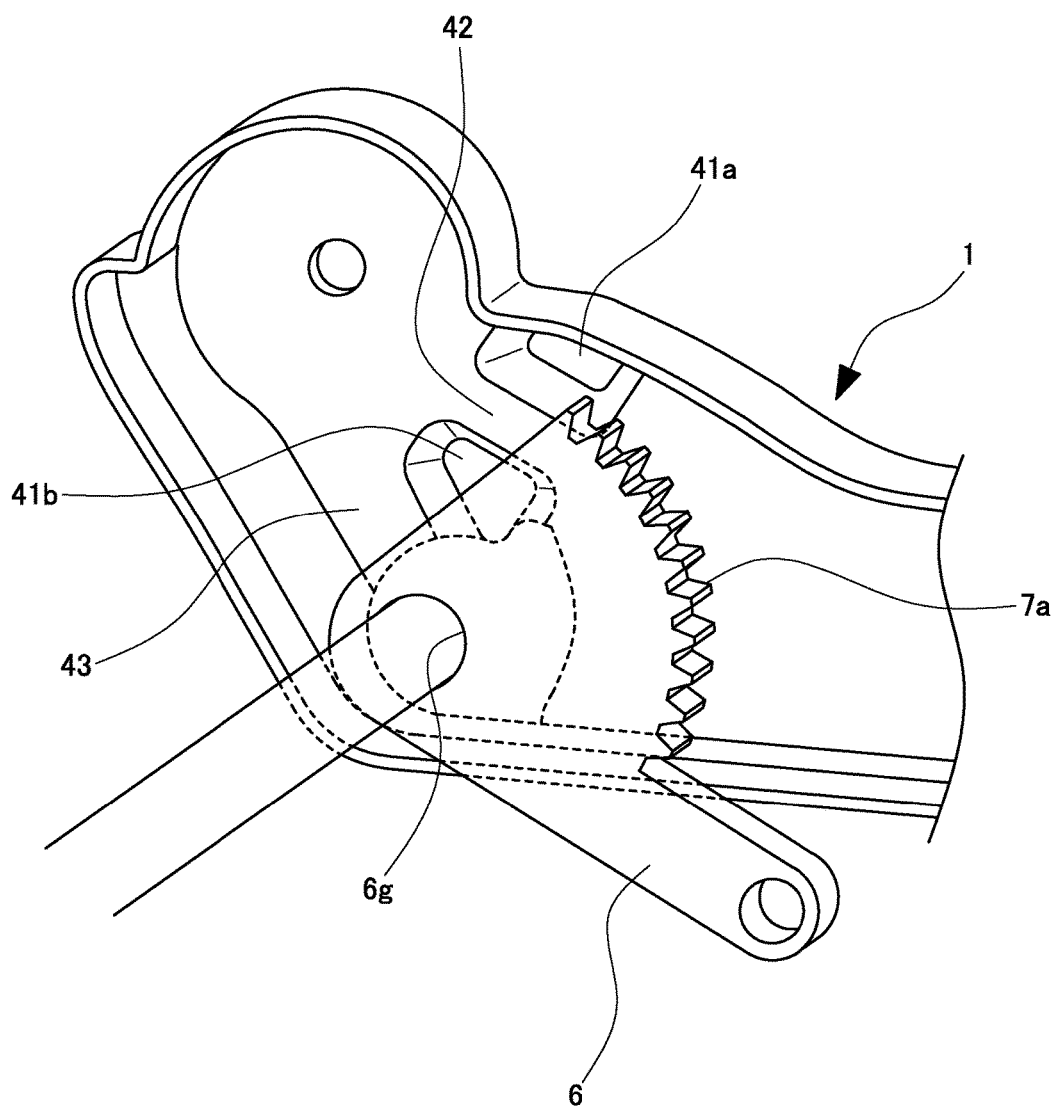
FIG. 9 is a perspective view diagram illustrating a positional relation between a second gear of the driving force transmission mechanism and the side frame of the cushion frame and is a diagram when viewed from the inside in the width direction.

Further, in the main seat S, the rear rotation link 6 is disposed at the inside of the side frame 1 in the width direction. Then, the rear depressed area T in the side frame 1 is disposed at a position adjacent to the sector gear 7a integrated with the rear rotation link 6. Particularly, in the main seat S, as shown in FIG. 9, both the upper reinforcement portion 42 and the lower reinforcement portion 43 are disposed at the positions facing the sector gear 7a. In this way, since the sector gear 7a is disposed at the position adjacent to the portion depressed inward in the width direction in the side frame 1, the sector gear 7a may be disposed in the vicinity of the side frame 1 while an increase in size of the side frame 1 is suppressed.

Further, since the sector gear 7a faces the portion of which the rigidity is improved by the upper reinforcement portion 42 and the lower reinforcement portion 43 in the side frame 1, the portion regulates the outward bending amount of the sector gear 7a in the width direction, and hence the deformation of the sector gear 7a is suppressed. Further, in the main seat S, the upper reinforcement portion 42 and the lower reinforcement portion 43 are formed so that the gap between both reinforcement portions is widened as it goes toward the sector gear 7a (that is, the second connection portion T2). Accordingly, since the range of regulating the outward bending amount of the sector gear 7a in the width direction is widened, the effect of suppressing the deformation of the sector gear 7a is improved.

Furthermore, in the main seat S, both the upper reinforcement portion 42 and the lower reinforcement portion 43 are disposed at the positions facing the sector gear 7a, but only one of the upper reinforcement portion 42 and the lower reinforcement portion 43 may be disposed at the position facing the sector gear 7a.

REFERENCE NUMERALS

S main seat
S1 seat back
S2 seat cushion
S3 headrest
S3a pillar
F main frame
F1 back frame
F2 cushion frame
fs guide stay
R slide rail mechanism
Ru upper rail
Rx, Ry link support portion
T rear depressed area
T1 first connection portion
T2 second connection portion
T3 third connection portion
U adjacent non-depressed area
1 side frame
1a outer surface
1b bolt hole
1c flange
1r, 1s, 1t, 1u shaft hole
2 leaf spring
3 reclining mechanism
3a reclining mechanism body
3b penetration shaft
4 height adjustment mechanism
5 manipulation lever
6 rotation link
6a, 6b, 6c, 6d connection shaft
6g pipe penetration hole
7 driving force transmission mechanism
7a sector gear
7b pinion gear
7c gear rotation shaft
8 brake mechanism
8a casing
9 connection pipe
11 side portion frame
11a locking bracket
41a, 41b bulged area
42 upper reinforcement portion
43 lower reinforcement portion

The invention claimed is:

1. A vehicle seat comprising:
a seat cushion which includes a cushion frame;
a seat back which is connected to the cushion frame;
an elevation mechanism which is driven to adjust the height of the seat cushion; and
a brake mechanism which maintains the height of the seat cushion when the elevation mechanism is not driven; and
a reclining mechanism which rotates the seat back about a rotary shaft with respect to the seat cushion,
wherein:
the brake mechanism is connected to a second connection portion different from a first connection portion connected to the seat back in the cushion frame; and
a reinforcement portion which extends in a direction from the first connection portion toward the second connection portion is provided between the first connection portion and the second connection portion in the cushion frame;
the cushion frame includes side frames which are disposed at both ends of the vehicle seat in a seat width direction of the vehicle seat;
the first connection portion, the second connection portion, and the reinforcement portion are provided in the side frame;
the reinforcement portion includes a first reinforcement portion and a second reinforcement portion located below the first reinforcement portion;
each of the first reinforcement portion and the second reinforcement portion is formed by depressing the side frame inward in the seat width direction;
the elevation mechanism includes a rotation body which rotates while being connected to the side frame when the height of the seat cushion is adjusted;
a connection shaft which rotatably connects the rotation body to the side frame is attached to a third connection portion located between the first connection portion and the second connection portion in the side frame;
the rotary shaft is attached to the first connection portion; and
the second reinforcement portion is provided between the rotary shaft and the connection shaft and in a center portion of the side frame in an up-down direction of the vehicle seat, is formed on an outer surface of the side frame in the seat width direction, and extends in a direction from the rotary shaft toward the connection shaft.

2. The vehicle seat according to claim 1,
wherein:
the brake mechanism is provided in a driving force transmission mechanism which transmits a driving force to the elevation mechanism;
the driving force transmission mechanism includes a rotation shaft which rotates when the driving force is transmitted to the elevation mechanism;
the rotary shaft is attached to the first connection portion;
the rotation shaft is attached to the second connection portion; and
the first reinforcement portion is provided between the rotary shaft and the rotation shaft in the side frame, and extends in a direction from the rotary shaft toward the rotation shaft.

3. The vehicle seat according to claim 1,
wherein a third reinforcement portion which is formed by bulging the side frame in a circular-arc shape outward in the seat width direction is provided between the first reinforcement portion and the second reinforcement portion in the side frame.

4. The vehicle seat according to claim 3, wherein the third reinforcement portion extends toward the second connection portion in the side frame.

5. The vehicle seat according to claim 1, wherein an end located near the second connection portion in the first reinforcement portion in the extension direction of the first reinforcement portion reaches the second connection portion.

6. The vehicle seat according to claim 1, wherein:
the brake mechanism is provided in a driving force transmission mechanism which transmits the driving force to the elevation mechanism;
the elevation mechanism includes a second gear which engages with a first gear of the driving force transmission mechanism;
the second gear is disposed at the inside of the side frame in the seat width direction, and
at least one of the first reinforcement portion and the second reinforcement portion is disposed at a position facing the second gear.

\* \* \* \* \*